United States Patent
Okamoto et al.

(10) Patent No.: US 10,732,363 B2
(45) Date of Patent: Aug. 4, 2020

(54) CLEANING STRING FOR CLEANING CONNECTOR AND METHOD FOR PRODUCING THE SAME

(71) Applicant: KB SEIREN, LTD., Fukui (JP)

(72) Inventors: Yoshihiro Okamoto, Osaka (JP); Naoyuki Yasuda, Osaka (JP); Kiyomichi Ninomiya, Shiga (JP); Shuhei Watabe, Shiga (JP)

(73) Assignee: KB SEIREN, LTD., Fukui (JP)

( * ) Notice: Subject to any disclaimer, the term of this patent is extended or adjusted under 35 U.S.C. 154(b) by 242 days.

(21) Appl. No.: 15/541,041

(22) PCT Filed: Mar. 16, 2017

(86) PCT No.: PCT/JP2017/010735
§ 371 (c)(1),
(2) Date: Jun. 30, 2017

(87) PCT Pub. No.: WO2017/159807
PCT Pub. Date: Sep. 21, 2017

(65) Prior Publication Data
US 2018/0088284 A1 Mar. 29, 2018

(30) Foreign Application Priority Data
Mar. 18, 2016 (WO) .................. PCT/JP2016/058813

(51) Int. Cl.
*G02B 6/38* (2006.01)
*B08B 1/00* (2006.01)

(52) U.S. Cl.
CPC ............ *G02B 6/3866* (2013.01); *B08B 1/008* (2013.01); *B08B 1/002* (2013.01)

(58) Field of Classification Search
CPC .................................................. G02B 6/3866
USPC ............. 428/364; 134/6, 40; 15/97.1, 209.1, 15/210.1
See application file for complete search history.

(56) References Cited

U.S. PATENT DOCUMENTS

| 2005/0016564 A1* | 1/2005 | Sekiya | ................. | A61C 15/041 132/323 |
| 2011/0047731 A1 | 3/2011 | Sugita et al. | | |
| 2015/0362681 A1* | 12/2015 | Watte | ................... | G02B 6/3866 385/58 |

FOREIGN PATENT DOCUMENTS

| JP | H09-31743 | | 2/1997 |
| JP | 2002-90576 A | | 3/2002 |
| JP | 2004-130209 | | 4/2004 |
| JP | 2004-333983 A | | 11/2004 |
| JP | 2005-140809 A | | 6/2005 |
| JP | 2009-103743 A | | 5/2009 |
| JP | 2009103743 A | * | 5/2009 |
| WO | 2009/119437 A1 | | 10/2009 |

OTHER PUBLICATIONS

Non-English Search Report and Written Opinion dated Apr. 11, 2017 for Application No. PCT/JP2017/010735.
Espacenet English abstract and translation of JP 2009-103743 A.
Espacenet English abstract and translation of JP 2005-140809 A.
Espacenet English abstract and translation of JP 2002-90576 A.
Espacenet English abstract and translation of JP 2004-333983 A.
English computer translation of JPH09-31743.
English computer translation of JP2004-130209.

* cited by examiner

*Primary Examiner* — Matthew D Matzek
(74) *Attorney, Agent, or Firm* — Ladas & Parry LLP; Malcolm J. MacDonald

(57) ABSTRACT

The present disclosure provides a cleaning string for cleaning a tip end face of a single core optical connector, which contains a quite small residual amount of oil components and has a high wiping property without the attachment of oil components to the tip end face of a single core optical connector.

Further, the present disclosure provides a method for producing a cleaning string for cleaning a connector which can suitably remove oil components adhering to a multifilament made of chemical fibers.

A cleaning string for cleaning a connector formed by twisting plural multifilament made of chemical fibers, wherein a residual amount of oil components is 3 mg/g or less.

A method for producing a cleaning string for cleaning a connector which comprises a step of removing oil components adhering to multifilament made of chemical fibers by washing with a surfactant-containing solution in a form of knitting, reel, or honeycomb wound before or after twisting plural multifilament made of chemical fibers, a step of washing with pure water, a step of drying and a step of unwinding the form.

7 Claims, No Drawings

CLEANING STRING FOR CLEANING CONNECTOR AND METHOD FOR PRODUCING THE SAME

TECHNICAL FIELD

The present disclosure relates to a cleaning string for cleaning a tip end face of a single core optical connector and a method for producing the same.

BACKGROUND OF THE DISCLOSURE

Conventionally, when a tip end face of a single core optical connector is cleaned, a cotton swab and the like are used generally. However, a cleaner with a cleaning string is proposed because the conventional technique is insufficient in the wiping performance and depends on an operator's skill (Patent document 1). However, patent document 1 does not disclose specifically about a cleaning string.

Further, as for the cleaning string, a cleaning string formed by aggregating plural chemical fibers having a smaller fiber diameter than an optical fiber diameter without twisting (Patent document 2).

PRIOR TECHNICAL DOCUMENTS

Patent Documents

[Patent Document 1] Japanese Kokai Publication 2002-90576
[Patent Document 2] Japanese Kokai Publication 2009-103743

SUMMARY OF INVENTION

Problems to be Solved by the Invention

Usually, oil components adhere to multifilament made of chemical fibers on spinning. If the multifilament is used as a cleaning string as it is for cleaning a tip end face of a single core optical connector, the oil components may adhere to the tip end face of the single core optical connector to increase light loss.

An object of the present disclosure is to provide a cleaning string for cleaning a tip end face of a single core optical connector, which contains a quite small residual amount of oil components and has a high wiping property without the attachment of oil components to the tip end face of a single core optical connector.

Further, an object of the present disclosure is to provide a method for producing a cleaning string for cleaning a connector which can suitably remove oil components adhering to a multifilament made of chemical fibers.

Means for Solving Object

As a result of intensive studies made by present inventors, the inventors found a washing method of a multifilament made of chemical fibers which can reduce the residual amount of oil components so that the present disclosure had finished. That is, an object of the present disclosure may be achieved by a cleaning string for cleaning a connector formed by twisting plural multifilament made of chemical fibers, wherein a residual amount of oil components is 3 mg/g or less.

The cleaning string for cleaning a connector preferably has a twist coefficient of 2 to 150.

The cleaning string for cleaning a connector preferably has a total fineness of 50 to 5500 dtex.

The cleaning string for cleaning a connector preferably has a single fiber fineness of 8 dtex or less.

The chemical fiber is preferably made of at least one polymer selected from the group consisting of a polyester, a polyamide, a polyurethane, a polyphenylene sulfide, a poly para-phenylene benzobisoxazole, a polyethylene, a polypropylene, a polyacrylonitrile, a polyvinyl alcohol, a rayon, a cupra, and an acetate.

The chemical fiber is more preferably made of at least one polymer selected from the group consisting of a polyester, a polyamide, a polyurethane, and a polyphenylene sulfide.

The chemical fiber is especially preferably made of a polyethylene terephthalate.

Another object of the present disclosure may be achieved by a method for producing a cleaning string for cleaning a connector which comprises a step of removing oil components adhering to multifilament made of chemical fibers by washing with a surfactant-containing solution in a form of knitting, reel, or honeycomb wound before or after twisting plural multifilament made of chemical fibers, a step of washing with pure water, a step of drying and a step of unwinding the form.

The method for producing a cleaning string for cleaning a connector preferably comprise a step of washing with an organic solvent before or after washing with the surfactant-containing solution.

Effects of the Invention

By the invention of the present disclosure, a cleaning string which can remove sufficiently oil components contained in a fiber, and have a high wiping property without the attachment of oil components to the tip end face of single core optical connector can be obtained. That is, the cleaning string of the present disclosure has a high wiping property without causing the attachment of oil components to the tip end face of a single core optical connector at the time of cleaning the tip end face of a single core optical connector, and does not cause an adhesion of foreign matters.

Further, the method for producing the cleaning string for cleaning a connector of the present disclosure can suitably remove oil components adhering to a multifilament made of chemical fibers, and is to obtain a cleaning string for cleaning a connector having a high wiping property.

DETAILED DESCRIPTION OF PREFERRED EMBODIMENTS

The cleaning string of the present disclosure is formed by twisting plural multifilament made of chemical fibers. The chemical fiber to be used is preferably at least one polymer selected from the group consisting of a polyester, a polyamide, a polyurethane, a polyphenylene sulfide, a poly para-phenylene benzobisoxazole, a polyethylene, a polypropylene, a polyacrylonitrile, a polyvinyl alcohol, a rayon, a cupra, and an acetate, and more preferably at least one polymer selected from the group consisting of a polyester, a polyamide, a polyurethane, and a polyphenylene sulfide.

In addition, lipophilic polyesters such as a polyethylene terephthalate and a polybutylene terephthalate are suitable for wiping the oil matter on the tip end face of single core optical connector, and a polyethylene terephthalate is especially preferred.

The polyester in the present disclosure contains all aromatic polyesters other than a polyethylene terephthalate and a polybutylene terephthalate.

The polyamide of the present disclosure contains all aromatic polyamides other than a polyamide 6, a polyamide 66, and a polyamide 12.

The polyethylene of the present disclosure contains a high-strength polyethylene.

The cleaning string of the present disclosure may be a composite fiber composed of several kinds of polymers, and may be formed by twisting several kinds of chemical fibers.

As for the cleaning string of the present disclosure, a multifilament made of chemical fibers having a single fiber fineness of 8 dtex or less is preferably used because the wiping performance is high if the single fiber fineness is low.

The cleaning string of the present disclosure preferably has a twist coefficient of 2 to 150, more preferably 10 to 100. When the twist coefficient is low, the length direction and the wiping direction of the multifilament made of chemical fibers become the same direction so that the wiping performance tends to be low. Further, when the twist coefficient is large, the string becomes hard so that a contact area with the tip end face of the single core optical connector is reduced to degrade the wiping performance.

In addition, the twist coefficient is calculated from the following formula:

$$K = T \times \sqrt{D}/100$$

(Twist coefficient: K, Fineness: D(dtex), Number of twists: T(t/m))

The cleaning string of the present disclosure preferably has a fineness of 50 to 5500 dtex, more preferably 110 to 1100 dtex considering the optical fiber diameter.

In the cleaning string of the present disclosure, it is needed that the residual amount of oil components is 3 mg/g or less. Further, it is preferably 2 mg/g or less. The parameter is needed in order to prevent oil components remained in the multifilament made of chemical fibers form adhering to the tip end face of a single core optical connector when the oil components on the tip end face of the single core optical connector is wiped.

The cleaning string of the present disclosure may be obtained by, before or after twisting plural multifilament made of chemical fibers which are obtained by a general melt-spinning method, removing oil components contained in the multifilament being in a washing form of knitting, reel, or honeycomb wound by washing each washing form with a surfactant-containing solution, washing with pure water, drying, and unwinding the form. As the washing form, a knitting is more preferred because a crimp is expressed after unwinding and the wiping performance is improved.

Further, the washing may be done before or after twisting, but the washing is preferably done after twisting because fluffs are reduced.

In the present disclosure, a circular knitting is preferred as the knitting of the washing form.

In the present disclosure, the reel of the washing form may be a reel having a size suitable for a washing apparatus.

In the present disclosure, the honeycomb wound of the washing form is a winding method which provides a stereo regularity and keeps a constant space between the multifilament made of chemical fibers. A contact area between each of multifilament made of chemical fibers in the honeycomb wound is smaller than that of the usual bobbin wound, and there are gaps running from the outermost surface to the innermost layer of the bobbin. Therefore, there are not many places where the washing solution is difficult to penetrate.

The surfactant to be used in the present disclosure contains nonionic surfactants, cationic surfactants, and anionic surfactants. The anionic surfactant is preferred because more oil components can be removed. Specifically, sodium lauryl sulfate (SDS), and sodium linear alkylbenzenesulfonate are contained.

In addition, an amount of the surfactant in the surfactant-containing solution is preferably 0.05 to 5% by weight.

The temperature of the surfactant-containing solution is preferably 40° C. or more.

The washing with the surfactant-containing solution is performed by using general apparatus such as an obermaier dyeing machine, a washer dyeing machine, a tumbler washing machine, a cheese dyeing machine, and an injection dyeing machine. Considering the adhesion of foreign matters, the washing is preferably performed in a clean room in which the manufacturing environment is ISO 6 class (a number of particles having a particle diameter of 0.5 μm or less is 35,200 particles/m$^3$ or less).

The washing with the surfactant-containing solution is preferably performed by immersing the multifilament in the surfactant-containing solution for 30 seconds to 10 minutes and washing for sufficiently penetrating the surfactant and improving the washing effect.

In the present disclosure, the oil components are preferably removed by using an organic solvent before or after washing with the surfactant-containing solution because a residual amount of the oil components is reduced. The organic solvent to be used for removing the oil components contains ethanol, methanol, 2-propanol and so on being organic solvents which can dissolve the oil components without dissolving a fiber and being easily water-soluble for the following washing with pure water. Among them, ethanol giving little harm to human body is preferred from the viewpoint of workability.

In the washing with pure water of the present disclosure, reverse osmosis water, ultrapure water and the like are preferably used.

In the drying of the present disclosure, it is preferred that moisture is removed substantially.

The unwinding in the present disclosure is preferably performed in an environment at a relative humidity of 20 to 60% and a temperature of 15 to 30° C. for suppressing the fluffing and the like due to mutual friction of fibers caused by static electricity.

The cleaning string of the present disclosure is high-performance cleaning string for cleaning which can sufficiently clean the tip end face of a single core optical connector and is used as a winding cleaning string for cleaning a connector.

EXAMPLES

Hereinafter, the present disclosure will be explained with reference to examples.

In the examples, each evaluation was conducted as follows.

Fluffing of the cleaning string was confirmed by using a fuzz detector (TEC-100F manufactured by TECHNO-MAC CORPORATION). When the fluff was not confirmed, it was assessed as ○. When a few fluffs were confirmed, it was assessed as Δ. When there was a lot of fluffs, it was assessed as x.

A residual amount of oil components in the cleaning string was confirmed by a method which comprises a step of extracting in accordance with Soxhlet method using methanol after unwinding, concentrating the extracted solution, and measuring the residual matters. Ten samples in the washing form of knitting, reel, honeycomb wound and bobbin wound respectively were tested, and the measured maximum value and minimum value were evaluated.

As the one for evaluating the washing performance of the cleaning string, the following test was done. A food oil was impregnated to a sanitary cotton, and the food oil 0.1 mg was applied on a cleaned glass plate. A glass rod with a diameter of 5 mm formed by winding the obtained cleaning string without gap was one-time reciprocated in the vertical direction to the length direction of the rod to wipe the applied food oil. Then, the level of wiping the food oil was observed by a microscope and the unwiped oil amount was measured by using an electronic balance (the minimum value is 0.01 mg). When the wiping property was extremely good (the unwiped oil amount 0.01 mg >), it was assessed as ⊙. When the wiping property was good (the unwiped oil amount was 0.01 mg or more and 0.05 mg or less), it was assessed as ○. When the wiping property was inferior (the unwiped oil amount was over 0.05 mg), it was assessed as x.

As the one for evaluating the washing performance of the cleaning string, the following test was done. A glass rod with a diameter of 5 mm formed by winding the obtained cleaning string without the gap was put on a cleaned glass plate, and the state of foreign matters adhering to the glass plate was observed by a microscope and the number of the foreign matters was counted by eyes. When there was no foreign matter adhering (0 to 2 of foreign matters), it was assessed as ○. When there is a slight matters adhering (3 to 20 of foreign matters), it was assessed as Δ. When there are many foreign matters adhering (21 or more of foreign matters), it was assessed as x.

Example 1

Multifilament formed by twisting three polyethylene terephthalate multifilament of 167 dtex/72f under a condition of a twist coefficient of 10 were knitted to give a circular knitting having a gaze of 13.

In a clean room where the number of particles having a particle diameter of 0.5 μm or less was 3,000 particles/m$^3$, a 1 wt % solution of anionic surfactant (EMAL 2FG manufactured by KAO Chemicals) was prepared as the first step of washing.

The prepared aqueous solution was set at 40° C., and the circular knitting was immersed in the aqueous solution for 10 minutes by using a washer dyeing machine to remove the oil components.

As the second step of washing, the circular knitting was put into a stainless sealed vessel, and immersed in ethanol for 5 minutes to remove oil components.

Then, the obtained circular knitting was washed with ultrapure water by using a washer dyeing machine.

The washed circular knitting was dried, and unwinded to obtain a cleaning string.

The cleaning performance of the obtained cleaning string was evaluated.

Example 2

The cleaning string was obtained by following the same procedure as that of example 1 except that the oil component removal by ethanol as the second step of washing was not done, and then the cleaning performance of the obtained cleaning string was evaluated.

Example 3

The cleaning string was obtained by following the same procedure as that of example 1 except that the washing form was honeycomb wound of twisted multifilament and a cheese dyeing machine was used for washing, and then the cleaning performance of the obtained cleaning string was evaluated.

Example 4

The cleaning string was obtained by following the same procedure as that of example 1 except that the washing form was honeycomb wound of twisted multifilament, a cheese dyeing machine was used for washing, and the oil component removal by ethanol as the second step of washing was not done and then the cleaning performance of the obtained cleaning string was evaluated.

Example 5

The cleaning string was obtained by following the same procedure as that of example 1 except that the washing form was reel of twisted multifilament, and an injection dyeing machine was used for washing and then the cleaning performance of the obtained cleaning string was evaluated.

Example 6

The cleaning string was obtained by following the same procedure as that of example 1 except that the washing form was reel of twisted multifilament, an injection dyeing machine was used for washing, and the oil component removal by ethanol as the second step of washing was not done and then the cleaning performance of the obtained cleaning string was evaluated.

Example 7

The cleaning string was obtained by following the same procedure as that of example 1 except that the twist coefficient was 100 and then the cleaning performance of the obtained cleaning string was evaluated.

Example 8

The cleaning string was obtained by following the same procedure as that of example 1 except that the circular knitting was washed under an environment that the number of particles having a particle diameter of 0.5 μm or less was 5,200,000 particles/m$^3$ and then the cleaning performance of the obtained cleaning string was evaluated.

Comparative Example 1

The cleaning string was obtained by following the same procedure as that of example 1 except that the washing form was bobbin wound of twisted multifilament and a cheese dyeing machine was used for washing, and then the cleaning performance of the obtained cleaning string was evaluated.

These results were shown in table 1.

TABLE 1

| Production method | | Ex. 1 | Ex. 2 | Ex. 3 | Ex. 4 | Ex. 5 | Ex. 6 | Ex. 7 | Ex. 8 | Compar. Ex. 1 |
|---|---|---|---|---|---|---|---|---|---|---|
| Material | | Polyester | Polyester | Polyester | Polyester | Polyester | Polyester | Polyester | Polyester | Polyester |
| Twist coefficient | | 10 | 10 | 10 | 10 | 10 | 10 | 100 | 10 | 10 |
| Environment Number of dust in the air number/m$^3$ | | 3,000 | 3,000 | 3,000 | 3,000 | 3,000 | 3,000 | 3,000 | 5,200,000 | 3,000 |
| Washing form | | Knitting | Knitting | Honeycomb wound | Honeycomb wound | Reel | Reel | Knitting | Knitting | Bobbin wound |
| Washing 1 | | Anionic surfactan | Anionic surfactan | Anionic surfactan | Anionic surfactan | Anionic surfactan | Anionic surfactan | Anionic surfactan | Anionic surfactan | Anionic surfactant |
| Washing 2 | | Ethanol | — | Ethanol | — | Ethanol | — | Ethanol | Ethanol | Ethanol |
| Fluff | — | ○ | ○ | ○ | ○ | Δ | Δ | ○ | ○ | ○ |
| Residual amount of oil components | MAX mg/g | 0.97 | 1.01 | 1.31 | 1.39 | 1.11 | 1.18 | 1.55 | 1.11 | 4.56 |
| | MIN | 0.72 | 0.69 | 0.84 | 0.91 | 0.78 | 0.81 | 1.21 | 0.77 | 2.54 |
| Wiping property | — | ◎ | ◎ | ○ | ○ | ○ | ○ | ◎ | ○ | X |
| Unwiped oil amount | mg | 0.01> | 0.01> | 0.03 | 0.04 | 0.05 | 0.05 | 0.01> | 0.03 | 0.08 |
| Adhesion of foreign matter | — | ○ | ○ | ○ | ○ | Δ | Δ | ○ | Δ | X |
| | Number | 0 | 0 | 2 | 2 | 12 fluff | 15 fluff | 1 | 20 dust | 95 oil components |

The fluff evaluation of example 1 was ○, because the fluff was not generated. Further, the residual amount of the oil components was 0.97 mg/g at most, so the oil components were sufficiently removed. In addition, the minimum value was 0.72 mg/g, so that the washing unevenness due to the place to be measured was not confirmed especially. The knitting was moved readily in a washer dyeing machine so that the residual amount of the oil components was small without an unevenness.

In the wiping property test, the evaluation of the wiping property is ◎ meaning extremely good because a crimp due to the knitting form was occurred after unwinding at the time of washing. Further, an adhesion of foreign matter was not confirmed so that the evaluation of the adhesion of foreign matter was ○. Therefore, it was suitable for a cleaning string.

The fluff evaluation of example 2 was ○. The maximum value of the residual amount of oil components was slightly larger than example 1 because the washing step by ethanol was not done. However, the value itself was sufficiently small, and the washing unevenness was not confirmed. Further, the wiping property was evaluated as ◎, and the adhesion of foreign matter was evaluated as ○. Therefore, it was suitable for a cleaning string.

The fluff evaluation of example 3 was ○. The residual amount of oil components was small and the washing unevenness was not confirmed. Further, the wiping property was evaluated as ○ meaning good, and the adhesion of foreign matter was evaluated as ○. Therefore, it was suitable for a cleaning string.

The fluff evaluation of example 4 was ○. The residual amount of oil components was small and the washing unevenness was not confirmed. Further, the wiping property was evaluated as ○, and the adhesion of foreign matter was evaluated as ○. Therefore, it was suitable for a cleaning string.

The fluff evaluation of example 5 was Δ because a few fluffs were generated at the time of unwinding the reel. The fluff was generated by entanglement of fibers at the time of washing. Further, the residual amount of oil components is small and the washing unevenness was not confirmed. Further, the wiping property was evaluated as ○, and the adhesion of foreign matter was evaluated as Δ because the fluffs were slightly adhered. The fluffs were adhered slightly but it is enough to be suitable for a cleaning string.

The fluff evaluation of example 6 was Δ. Further, the residual amount of oil components is small and the washing unevenness was not confirmed. Further, the wiping property was evaluated as ○, and the adhesion of foreign matter was evaluated as Δ because the fluffs were slightly adhered. It is enough to be suitable for a cleaning string.

The fluff evaluation of example 7 was ○. The residual amount of oil components was small and the washing unevenness was not confirmed. The residual amount of oil components was slightly larger than example 1, and this reason was that the fibers were closed to each other because of the larger twist coefficient than example 1 so that the washing was not easily performed. Further, the wiping property was evaluated as ◎, and the adhesion of a foreign matter was evaluated as ○. Therefore, it was suitable for cleaning string.

The fluff evaluation of example 8 was ○. The residual amount of oil components was small and the washing unevenness was not confirmed. Further, the wiping property was evaluated as ○, and the adhesion of foreign matter was evaluated as Δ because the washing was done in an environment where a lot of dust exist in the air, so that the lot of dust adhering to the cleaning string adhered to the glass plate. However, it is enough to be suitable for a cleaning string.

The fluff evaluation of comparative example 1 was ○. As for the residual amount of oil components, the minimum value was 2.54 mg/g, and the washing unevenness was large depending to the place to be measured and the removal of oil components was insufficient. The maximum value was 4.56 mg/g. The washing form was bobbin wound, and the multifilament made of chemical fibers were closed to each other so that the washing solution could not penetrate easily. The wiping property was evaluated as x because the residual amount of oil components contained in the cleaning string was large. The adhesion of a foreign matter was evaluated as x because the residual amount of oil components contained in the cleaning string was large so that the oil components adhered to the glass plate when the cleaning string was pressed to the glass plate. Therefore, it was not suitable for a cleaning string.

INDUSTRIAL APPLICABILITY

The cleaning string for cleaning a connector of the present disclosure may be used suitably for cleaning a tip end face of a single core optical connector

The invention claimed is:

1. A cleaning string for cleaning a connector, comprising:
   twisted multifilaments made of chemical fibers,
   wherein oil components adhering to the multifilaments are removed by washing a form of the multifilaments, before or after twisting, with a surfactant-containing solution,
   wherein the form is a knitting, a reel, or a honeycomb wound,
   wherein a residual amount of oil components in the cleaning string is 3 mg/g, or less,
   wherein a twist coefficient is 2 to 150,
   wherein a single fiber fineness is 8 dtex, or less, and
   wherein a total fineness is 110 to 1100 dtex.

2. The cleaning string for cleaning a connector according to claim 1, wherein the chemical fibers are made of at least one polymer selected from the group consisting of a polyester, a polyamide, a polyurethane, a polyphenylene sulfide, a poly para-phenylene benzobisoxazole, a polyethylene, a polypropylene, a polyacrylonitrile, a polyvinyl alcohol, a rayon, a cupra, and an acetate.

3. The cleaning string for cleaning a connector according to claim 1, wherein the chemical fibers are made of at least one polymer selected from the group consisting of a polyester, a polyamide, a polyurethane, and a polyphenylene sulfide.

4. The cleaning string for cleaning a connector according to claim 1, wherein the chemical fibers are made of a polyethylene terephthalate.

5. A method for producing the cleaning string according to claim 1, comprising:
   a step of removing the oil components adhering to the multifilaments by washing the form with the surfactant-containing solution,
   wherein the washing with the surfactant-containing solution is carried out before or after twisting plural multifilaments made of chemical fibers,
   a step of washing with pure water,
   a step of drying, and
   a step of unwinding the form.

6. The method according to claim 5, further comprising a step of washing the form with an organic solvent before or after washing with the surfactant-containing solution.

7. The cleaning string for cleaning a connector according to claim 1, wherein the cleaning string comprises three multifilaments.

* * * * *